Figure 1:
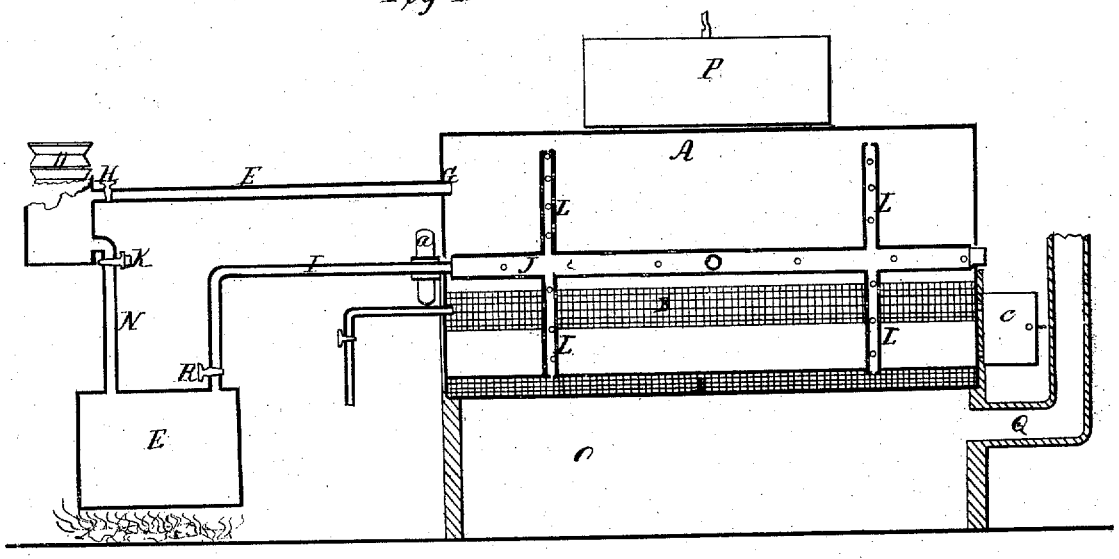
Figure 2:
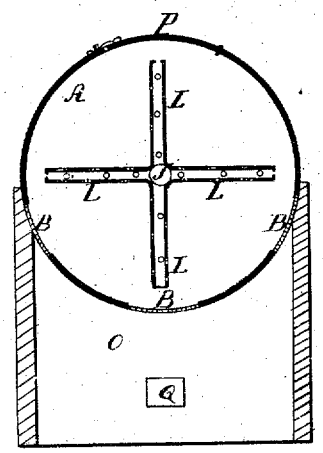

9787X

R. P. Coston.

Feather Renovator.

Patented Jun. 28, 1836.

THE NORRIS PETERS CO., WASHINGTON, D. C.

9787X

June 28, 1836

Benton P. Coston. 439

The Schedule referred to in these Letters Patent and mak-
ing part of the same containing a description in the words of the
said Benton P. Coston himself of his improve-
ment in certain parts of the process of Cleaning and
renovating feathers To all to whom these presents shall come
Be it known that I Benton P. Coston of Sterling
in the County of Wayne and State of Pennsylvania
have invented new and useful improvements in cer-
tain parts of the process of renovating or Cleaning feathers
and that the manner in which the same is to be per-
formed is particularly described and ascertained in
the following explanation and description thereof
and of one of the modes in which the same may be car-
ried into effect, reference being had to the drawing here-
unto annexed and to the letters marked therein, that
is to say. The application of steam within the cylinder that forms
an enclosure for the feathers during the process of cleaning
made by means of a tube or hollow cylinding through the
axis of it, and which is made to revolve therein for the
purpose of agitating them has been already known and used,
and therefore forms no part of my invention, though
this method of using the steam may serve for the first
part of the operation; But after that is done I introduce
hot air so as to force it amongst the feathers in all di-
rections in the same manner*. I also discharge the feath-
ers from the cylinder after they are finished by means of
forcing air in at one end of it through an opening made
for the purpose, so as to drive them out at a doorway
made large enough to admit of their free passage out,
But in order that my invention may be better understood I will
now describe the drawing hereunto annexed, by the letters there[illegible]

*as the steam has been during the first part of the operation; by which means they will
be thoroughly dried, after the action of said steaming.

are marked, that is to say) Fig. 1. is an elevation of the ma-
chine showing the construction of a hollow shaft and arms to
revolve by means of a pulley a. serving to diffuse the
hot air amongst the feathers, the whole revolving within a cylin-
der A shaped either as a duodecagon or other sided figure.
This cylinder is left open along the sides at intervals, say
on three spaces, upon the lower half only, as will be described
hereafter. These spaces are kept covered by means of wire work
or gratings, so as that the dirt & impurities arising or driv-
ing by the rush of air through the axis and arms be driv-
en out at these openings and gratings as at B.
At one end is made the opening or door C. through
which the feathers when finished are driven out by the force
of the bellows D. acting above the reservoir or hot air cham-
ber E and forcing cold air through the tube F by the
opening G. so as to produce a constant current thereof through
the door (way) C. until all the feathers are discharged, it
being understood that the stop cock H had been pre-
viously opened for that purpose. Another tube I leads
from the air chamber so as to be introduced into the mouth
of the hollow axis J. which is also to be furnished with
the stop cocks K & R. & which being opened whilst that at
H is closed allows the hot air to escape into the hollow axis
J & thence be distributed by means of the arms L through the
feathers in like manner as had previously been done,
by the introduction of another tube with its stop cock intended
to conduct the steam from its chamber as has been alrea-
dy used and known and for which reason I do not need
describe them here, though I prefer introducing steam
through a separate tube so as to let it into the cylinder
below the shaft & not at all connected with it —
The application of heat is of course made below the air
chamber into which the air is compressed or forced by any of the known modes in use. The ordinary tube bellows being
one well adapted to the purpose and this is applied at the top of
the tube N. leading into the receiver E & the cock R. & also
H. being closed the Chamber may be filled and the heater
ready for application. When the cock R being opened
the contents may be forced by the use of the bellows before
through the tube I into the hollow axle J. The cylinder
is to be enclosed in an outside case as shown at O. which
will reach about half way up the side of said cylinder so
as to enclose the gratings B as above described. There is
also to be a door for the introduction of the feathers at the
top of the cylinder as at P. It will also appear that the
dust and impurities driven off through the gratings B.
must be of course received within the case O at the end of
which is made the draft opening or flue Q for the
purpose of carrying off as well as the steam &c which
would otherwise be an annoyance in the work room.
The hollow shaft as well as the arms are furnished with
small apertures numerously dispersed throughout, for
the purpose of distributing the hot air, In the operation
according to my process, I first make use of steam intro-
duced through the separate tube as described until the
feathers are clean, then by shutting it off by the cock
M. and opening those at K & R. the force of the bellows
is applied at the top of the tube N. when the heated air
is driven through the axle & arms until the feathers are
completely dried by the agitation, When closing the cock
K & opening H the cold air is driven by the tube L.
through the opening G. so as to displace the feathers through
the door C. the gratings B. being previously closed by
shutters or sliding doors. When the said feathers fall
into the situation described perfectly cool and dry.
What I claim as my invention and for which I wish
Letters

9787X

Letters Patent is the improvement in the process of renovating feathers by introducing hot air to dry them (and blow off the impurities after they have been cleansed by steam in the ordinary way, According to the above description thereof. Also for cooling and discharging them by the forcing in of cold air as explained. & for employing for that purpose any apparatus substantially the same as that herein before mentioned and set forth —
In testimony that the above is a full description I have hereunto set my hand.

Witnesses
B. K. Morsell
Wm Cooper Jr.

Burton P. Carlton

Exd
[illegible]

Drawings

[illegible]